United States Patent [19]

Piotrowski et al.

[11] Patent Number: 5,182,065
[45] Date of Patent: Jan. 26, 1993

[54] METHOD FOR PRODUCING STRUCTURAL INJECTION MOLDED PARTS USING LOST MOTION MOVEMENT BETWEEN A MOLD AND SURROUNDING CUTTING BLADE

[75] Inventors: Stanley Piotrowski, Kitchener; Ronald I. Levine, Waterloo, both of Canada

[73] Assignee: Ontario Die Company Limited, Ontario, Canada

[21] Appl. No.: 774,128

[22] Filed: Oct. 11, 1991

Related U.S. Application Data

[63] Continuation of Ser. No. 516,183, Apr. 30, 1990, abandoned.

[51] Int. Cl.5 .................. B28B 7/14; B29C 33/24; B29C 45/16
[52] U.S. Cl. .................. 264/153; 264/163; 264/257; 264/266; 264/324; 425/112; 425/292
[58] Field of Search ........... 264/153, 163, 257, 324, 264/266; 425/112, 292, DIG. 48

[56] References Cited

U.S. PATENT DOCUMENTS

| | | | |
|---|---|---|---|
| 2,849,026 | 8/1958 | Taplin . | |
| 3,028,284 | 4/1962 | Reeves | 264/257 |
| 3,520,750 | 7/1970 | Li et al. . | |
| 3,577,594 | 5/1971 | Al-Roy | 425/292 |
| 3,584,109 | 6/1971 | Meadors et al. | 264/292 |
| 3,726,953 | 4/1973 | Jones et al. | 264/292 |
| 3,755,522 | 8/1973 | Jope et al. | 264/163 |
| 3,979,174 | 9/1976 | Hillman et al. | 425/292 |
| 4,216,184 | 8/1980 | Thomas | 425/112 |
| 4,459,092 | 7/1984 | Hatekeyama | 425/292 |
| 4,543,862 | 10/1985 | Levene et al. | 83/19 |
| 4,672,870 | 6/1987 | Levene et al. | 83/19 |
| 4,694,719 | 9/1987 | Levene et al. | 83/451 |
| 4,852,439 | 8/1989 | Levene et al. | 83/19 |

FOREIGN PATENT DOCUMENTS 42-11508 6/1967 Japan .
859157 8/1981 U.S.S.R. .

Primary Examiner—Jan H. Silbaugh
Assistant Examiner—Angela Y. Ortiz
Attorney, Agent, or Firm—Krass & Young

[57] ABSTRACT

A method for forming structural injection molded parts includes the steps of positioning a closed-loop cutting blade in surrounding relation to one of a male and female mold which together define a mold cavity corresponding to the shape of a part to be molded, positioning reinforcing material over the female mold, moving the male mold into the female mold to position the reinforcing material in the mold cavity, thereafter moving the cutting blade independently of the mold which it surrounds to trim the reinforcing material, and injecting resin into the mold cavity to produce a structural injection molded part. The cutting blade and the mold which it surrounds are part of and movable with a common die set assembly having a lost motion drive connection between the mold and the cutting blade, such that the trimming step is accomplished by lost motion movement between the mold and the cutting blade after the male and female molds have been mated. The method also includes the step of selectively controlling the clamping pressure on the reinforcing material about the peripheral interface of the molds.

10 Claims, 5 Drawing Sheets

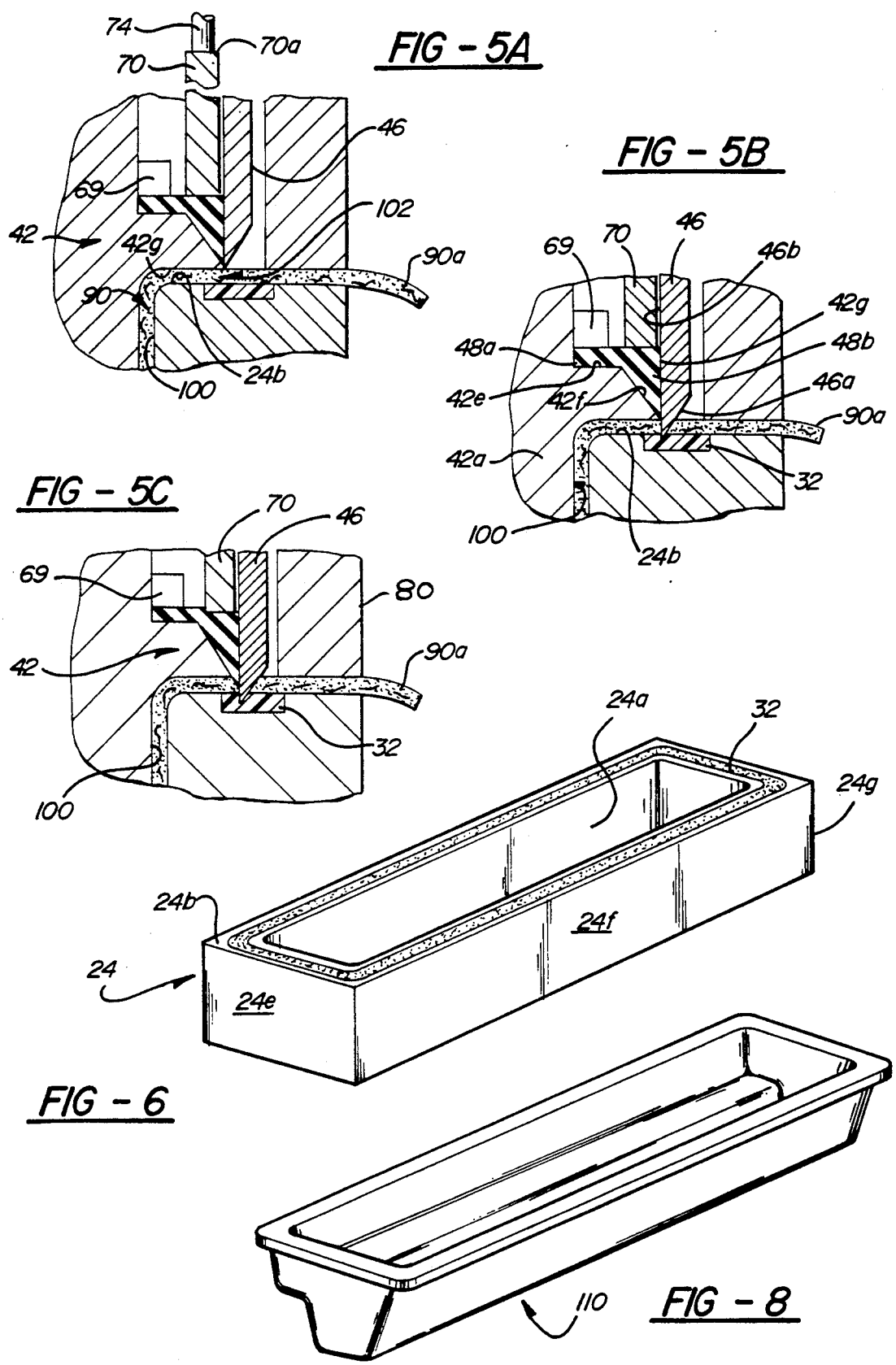

METHOD FOR PRODUCING STRUCTURAL INJECTION MOLDED PARTS USING LOST MOTION MOVEMENT BETWEEN A MOLD AND SURROUNDING CUTTING BLADE

This is a continuation of copending application Ser. No. 07/516,183 filed on Apr. 30, 1990, now abandoned.

BACKGROUND OF THE INVENTION

This invention relates to structural injection molded parts and more particularly to an improved method and apparatus for forming such parts.

Structural injection molded parts are parts formed of an injection molded resin material with one or more sheets of reinforcing fabric or material embedded in the resin to enhance the structural strength of the part. Structural injection molded parts are finding increased application in many industries because they possess the moldability and formability characteristics of injection molded parts and yet have sufficient strength to enable them to be employed in applications where structural strength is critical. Whereas various methods and apparatus have heretofore been proposed to produce structural injection molded parts, the prior art methods and apparatus have been unduly complicated and expensive.

SUMMARY OF THE INVENTION

This invention is directed to the provision of an improved method and apparatus for producing structural injection molded parts.

The invention methodology includes the steps of providing a mold assembly including a female mold part defining a concavity and a male mold part defining a convexity sized to fit into the concavity of the female mold part to define a mold cavity corresponding to the shape of the part to be molded; positioning reinforcing material over the concavity of the female mold part; moving the male mold part convexity into the female mold part concavity to position the reinforcing material in the mold cavity; and injecting resin into the mold cavity to produce a structural injection molded part. This methodology allows all of the steps necessary to produce a structural injection molded part to be performed in a single continuous process.

According to a further feature of the invention methodology, the method includes the further step of trimming the material to the shape of the part after the material is moved into the mold cavity. This methodology allows the necessary trimming function to be readily incorporated into the invention methodology.

According to a further feature of the invention methodology, a closed loop cutting blade is positioned in surrounding relation to one of the mold parts and the trimming step is performed by moving the cutting blade relative to the surrounded mold part. This methodology provides a compact and efficient package for performing the forming and trimming functions.

According to a further feature of the invention methodology, the mold and the cutting blade it surrounds are part of and movable with a common die set assembly with a lost motion drive connection between the mold and the cutting blade. The trimming step is accomplished by lost motion movement between the mold and the cutting blade.

According to a further feature of the invention methodology, the trimming step is performed before the resin injecting step. This arrangement allows the resin injection step to be confined to the configuration and extent of the finished part.

According to a further feature of the invention methodology, a seal is provided around the peripheral edge of the female mold concavity to preclude the escape of resin from the mold cavity.

According to a further feature of the invention, the trimming step is performed with a closed loop cutting blade and the seal is provided proximate the inner periphery of the cutting blade. This arrangement allows a convenient means of precluding the escape of resin between the male mold and the cutting blade.

According to a further feature of the invention methodology, the male mold part is positioned within the cutting blade and defines an annular interface with the cutting blade, a seal is position-ed around the male mold part at the interface between the male mold part and the cutting blade, and means are provided to press the seal into the interface between the male mold part and the cutting blade following the trimming step. This arrangement ensures that there will be no leakage of resin between the cutting blade and the mold part.

According to a further feature of the invention methodology, before the male mold part is moved into the female mold part concavity, the reinforcing material is clamped around the periphery of the concavity. This arrangement allows selective control of the movement of the material into the mold cavity as the male mold part convexity is moved into the female mold part concavity.

According to a further feature of the invention methodology, the reinforcing material is substantially non-stretchable and the clamping step includes selectively controlling the clamping pressure to allow material to selectively slip pass the clamping interface to allow the male mold part to move into the concavity.

According to a further feature of the invention methodology, the clamping step includes selectively varying the clamping pressure around the clamped peripheral interface to provide a varying clamping force on the material as measured around the clamping interface. This arrangement allows the slippage as between the clamping means and the material to be selectively controlled to selectively control the movement of the material into the mold cavity.

According to a further feature of the invention methodology, the resin injecting step is performed by introducing resin into the mold cavity through the female mold part. This arrangement simplifies the introduction of the resin into the mold cavity.

The apparatus according to the invention includes a mold assembly including a female mold part defining a concavity and a male mold part defining a convexity sized to fit into the female mold part concavity; and means for moving the mold parts between a retracted position in which the male mold part convexity is withdrawn from the female mold part concavity and an inserted position in which the male part convexity is positioned within the female mold part concavity to define a mold cavity therebetween corresponding to the shape of the part to be molded and further define an access opening therebetween at the periphery of the concavity providing access to the mold cavity from a location external to the mold assembly whereby to allow a sheet of reinforcing material to be positioned over the concavity with the mold parts in their retracted position whereafter the mold parts may be moved to their inserted positions to position the sheet within the mold cavity with edge portions thereof extending through the access opening to a location external to the mold cavity; and means for injecting resin into the mold cavity to impregnate the sheet of reinforcing material and form a reinforced structural injection molded part. This arrangement allows a single apparatus to perform all of the major steps required to produce a structural injection molded part.

According to a further feature of the invention apparatus, the apparatus further includes means for trimming the edge portions of the sheet. This arrangement allows the invention apparatus to further incorporate the means to trim the part to its final configuration.

According to a further feature of the invention apparatus, the trimming means comprises a cutting blade mounted in surrounding relation to the male mold part and mounted for cutting movement relative to the male mold part. This arrangement provides a convenient and compact package that provides an effective means for trimming the part.

According to a further feature of the invention apparatus, the mold and the cutting blade it surrounds are part of and moveable with a common die set assembly with a lost motion drive connection between the mold and the cutting blade. The trimming step is accomplished by lost motion movement between the mold and the cutting blade.

According to a further feature of the invention apparatus, the apparatus further includes means for clamping the edge portions of the sheet. This arrangement allows the apparatus to control the movement of the sheet into the mold cavity.

According to a further feature of the invention apparatus, the clamping means comprises pressure plate means positioned in surrounding relation to the male mold part. This arrangement provides a compact and efficient package and provides effective control of the movement of the material into the mold cavity.

According to a further feature of the invention apparatus, means are providing for sealing the mold cavity proximate the access opening to the mold cavity. This arrangement ensures that resin will not escape from the mold cavity during the resin injection operation.

According to a further feature of the invention apparatus, the sealing means includes a seal structure mounted in surrounding relation to the male mold part. This arrangement provides a convenient means of sealing the mold cavity.

According to a further feature of the invention apparatus, the seal structure is mounted on the periphery of the male mold part and the apparatus further includes pressure plate means positioned in surrounding relation to the male mold part within the cutting blade and having an edge engaging the seal structure. This arrangement allows the seal to be pressed into the sealing interface to further enhance the sealing function.

BRIEF DESCRIPTION OF THE DRAWINGS

FIGS. 5A, 5B and 5C are detail views taken within the circle 5 of FIG. 2;

FIG. 6 is a perspective view of the female mold part;

FIG. 8 is a perspective view of a structural injection molded part formed utilizing the method and apparatus of the invention.

DETAILED DESCRIPTION OF THE PREFERRED EMBODIMENT

Figure 1:
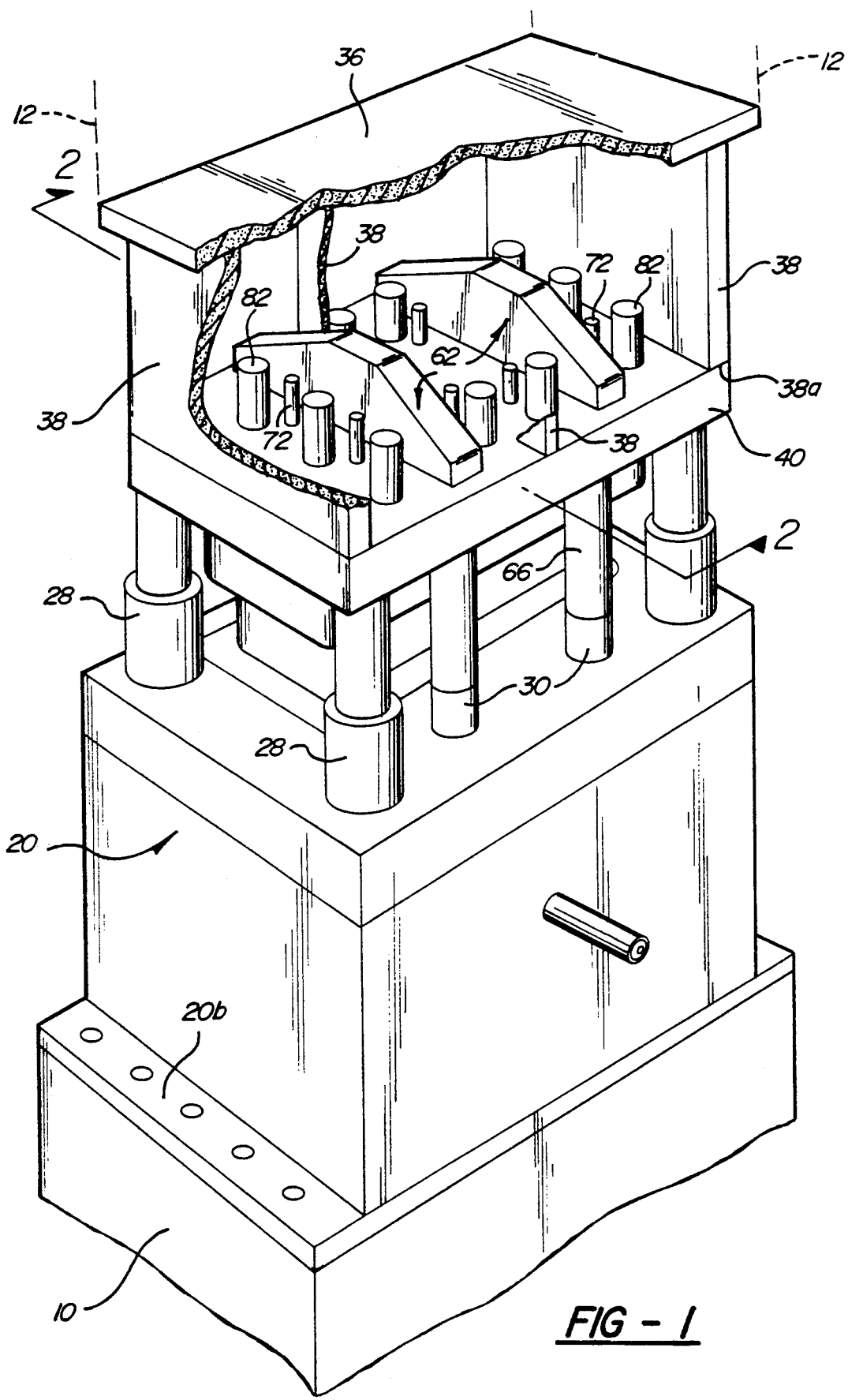
FIG. 1 is a fragmentary perspective view of the invention apparatus.
Figure 2:
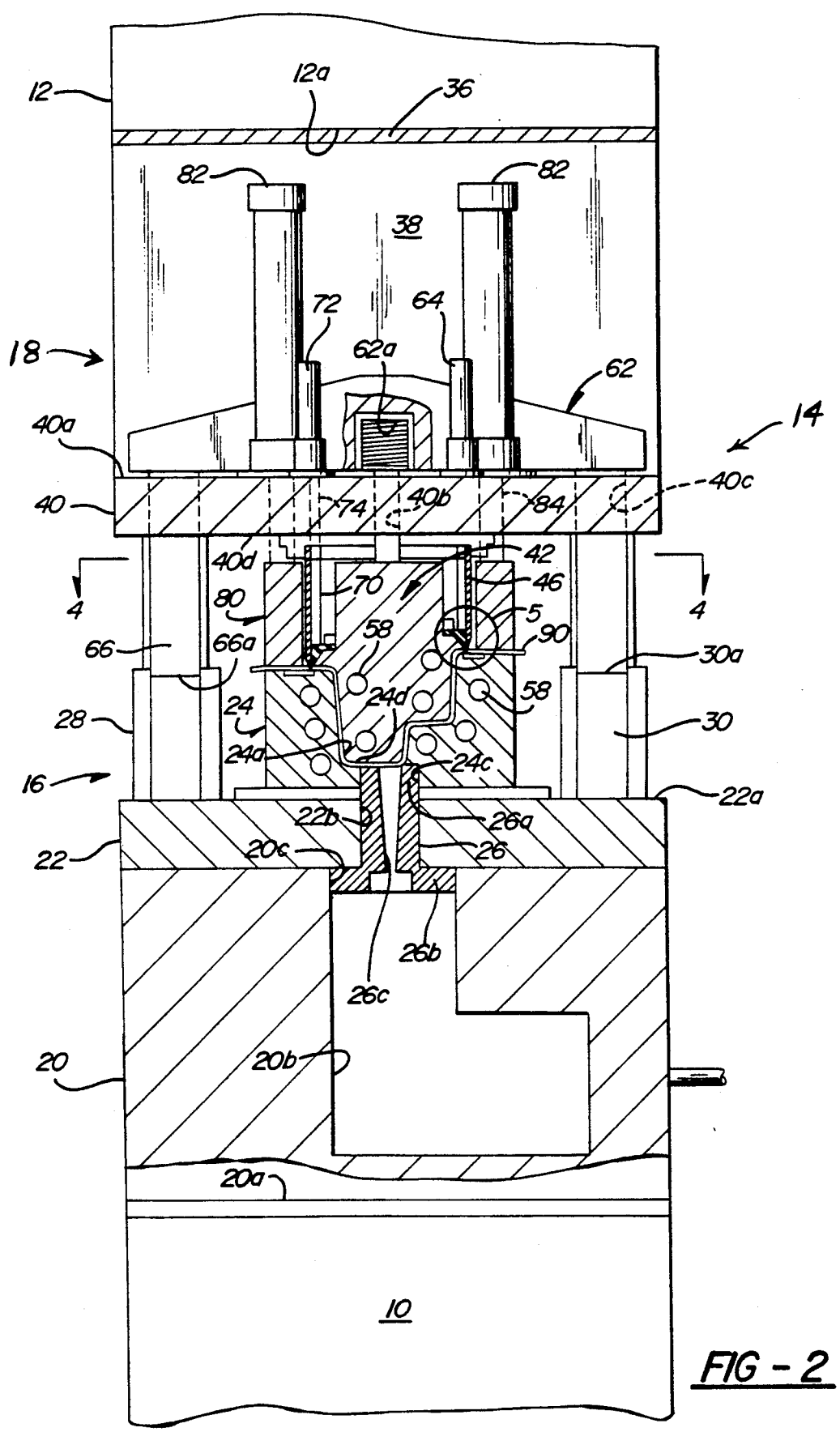
FIG. 2 is a cross-sectional view taken on line 2—2 of FIG. 1 and showing the mold parts in their inserted disposition.

The invention apparatus is intended for use with a conventional press, hydraulic or otherwise, including a bed 10 and a head 12 movable toward and away from each other in known manner to actuate apparatus positioned between the head and the bed.

The invention apparatus comprises a die set adapted to be positioned between bed 10 and head 12 and including a lower die set assembly 16 and an upper die set assembly 18.

Lower die set assembly 16 includes a mixing head 20, a bottom plate 22, a bottom or female mold 24, an injection nozzle 26, corner bushings 28, and stop blocks 30.

Mixing head 20 includes flange portions 20a for bolting the mixing head to the upper face of press bed 10 and defines a central reaction chamber 20b opening at 20c in the upper face of the mixing head.

Bottom plate 22 has a rectangular configuration generally conforming to the configuration of mixing head 20 and bed 10 and is suitably secured to the upper face of the mixing head.

Bottom or female mold 24 is suitably and centrally secured to the upper face 22a of bottom plate 22 and defines a mold concavity 24a having a size and configuration determined by the size and configuration of the part to be formed. As best seen in FIG. 6, mold 24 has an annular configuration and includes a-cutting barrier in the form of an annular strip 32 positioned in an annular groove on the upper face 24b of the mold in surrounding relation to mold cavity 24a. Strip 32 may be formed for example of aluminum, polyethylene, nylon, steel, brass or other appropriate material and is intended to receive a cutting edge of the cutting blade of the invention apparatus during the trimming operation.

Injection nozzle 26 is positioned in a central aperture 22b of bottom plate 22 and includes an upper end portion 26a extending upwardly through a central aperture 24c in bottom mold 24 and a lower portion 26b positioned in the opening 20c of mixing chamber 20b with the central passage 26c of the nozzle opening at its upper end in the lower wall 24d of mold cavity 24a and opening at its lower end in mixing chamber 20b so as to provide communication between mixing chamber 20b and mold cavity 24a.

Bushings 28 are provided at the four corners of bottom plate 22 and project upwardly from the top face 22a of bottom plate 22.

Stop blocks 30 project upwardly from the top face 22a of bottom plate 22 at locations intermediate the corners of the bottom plate.

Upper die assembly 18 includes a mounting plate 36, risers 38, a top plate 40, an upper or male mold 42, a male mold mounting and stop system, a cutting blade 46, a seal 48, a seal pressure plate assembly, and a material pressure plate assembly.

Mounting plate 36 is suitably secured as by bolting to the bottom face 12a of press head 12.

Risers 38 extend rigidly downwardly from mounting plate 36.

Top plate 40 is secured at its upper face 40a to the lower edges 38a of risers 38 and has a size and configuration generally conforming to bottom plate 22.

Figure 7:
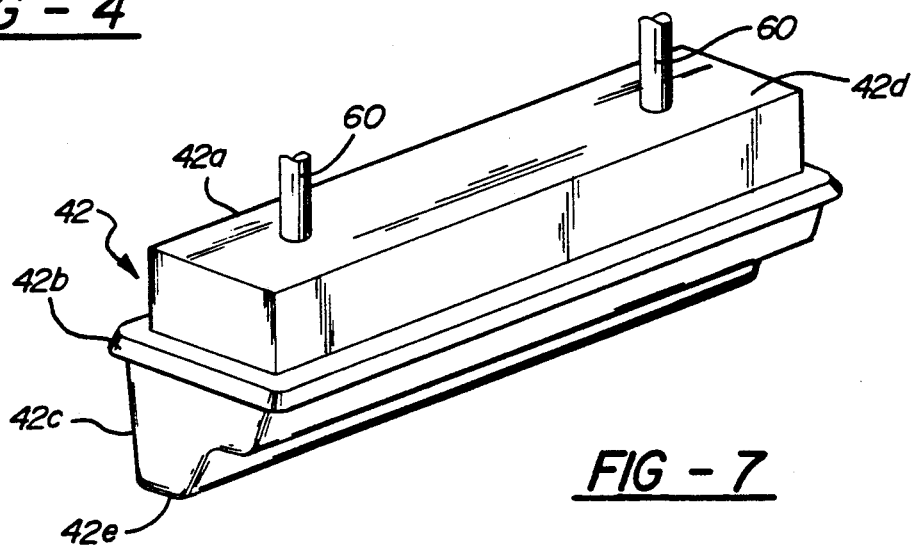
FIG. 7 is a perspective view of the male mold part.

Upper or male mold 42, as best seen in FIG. 7, includes a main body portion 42a, an annular ledge or lip portion 42b, and a convex lower portion 42c. Lower portion 42c is sized to fit within lower mold concavity 24a to define a mold cavity therebetween with lip or ledge 42b seating around the upper face of the concavity 24a proximate the cutting barrier 32.

Liquid ducts 58 are provided in upper and lower molds 42,24 to allow a cooling or heating liquid to be circulated through the molds to maintain a desired mold temperature.

The male mounting and stop system includes a pair of rods 60 rigidly secured to the upper face 42d of male mold 42 and extending upwardly therefrom for passage through bores 40b in top plate 40; a pair of outriggers or beams 62 positioned above top- face 40a of top plate 40; a pair of springs 64 positioned respectively in downwardly opening bores 62a provided in beam 62 and engaging the upper ends of rods 60; and rods 66 extending downwardly from the ends of beam 62 through apertures 40c in top plate 40 for stopping engagement at their lower ends 66a with the upper ends 30a of stop blocks 30. Rods 60, beams 62 and springs 64 comprises a lost motion drive connection between male mold 42 and surrounding cutting blade 46, which is rigidly mounted to top plate to. This lost motion drive connection provides for independent, lost motion movement between cutting blade 46 and male mold 42 as hereinafter described.

Cutting blade 46 is in the form of a closed loop steel blade rigidly secured to the underface 40d of top plate 40 in surrounding relation to main body portion 42a of male die 42. The lower edge of cutting blade 46 is beveled to define an annular cutting edge 46a.

Figure 4:
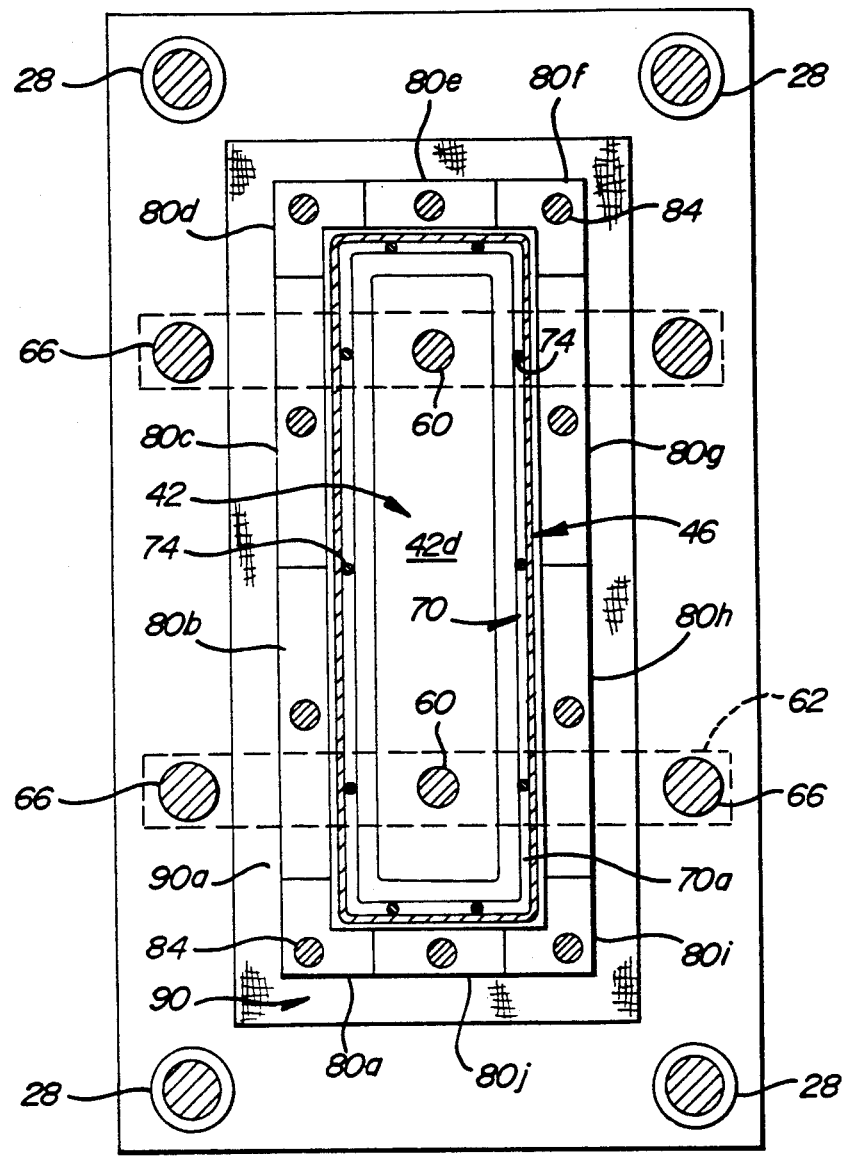
FIG. 4 is a cross-sectional view taken on line 4—4 of FIG. 2.

Seal 48 is an annular elastomeric member and is positioned on the upper face 42e of lip 42b. Seal 48 includes a mounting or flange portion 48a seated on the lip upper face 42e and a main body triangular portion 48b seated on the angled outer peripheral face 42f of lip 42b and slidably engaging at its outer periphery 42g with the inner periphery 46b of cutting blade 46 proximate the lower end edge of the cutting blade. A ring member 69 is secured to male mold main body portion 42a to securely mount seal 48 with respect to the male mold. The seal pressure plate assembly includes an annular pressure plate 70 and a plurality of power cylinders 72. Pressure plate 70, as best seen in FIG. 4, has an annular configuration conforming in size and shape to the annular configuration of the triangular portion 48b of seal 48 and is positioned concentrically and slidably within the inner face 46b of cutter 46. As shown, pressure plate 70 may comprise a single unitary annular member or, alternatively, may comprise a series of segments together making up the annular configuration of the pressure plate. Power cylinders 72 are positioned on the upper face 40a of top plate 40 in an annular pattern corresponding to the annular shape of pressure plate 70 and each includes a piston rod 74 extending downwardly through an aperture in top plate 40 for engagement with the upper edge 70a of annular pressure plate 70.

The material pressure plate assembly includes an annular pressure plate 80 positioned in surrounding relation to cutting blade 46 and a plurality of power cylinders 82. Whereas pressure plate 80 may comprise a single unitary annular member, preferably, and as shown, pressure plate 80 is formed of a series of pressure plate segments 80a–j together defining an annular configuration in surrounding relation to cutting blade 46.

Power cylinders 82 are mounted on the top face 40a of top plate 40 and arranged in an annular pattern corresponding to the annular configuration of pressure plate 80. Each power cylinder 82 includes a piston rod 84 extending downwardly through-an aperture in top plate 40 for securement to the top edge of pressure plate 80. As shown, a power cylinder 82 and a piston rod 84 is associated with each segment of the pressure plate so that the pressure plate segments may be individually controlled to vary the pressure applied along the lower edge 80k of the pressure plate assembly as measured around the periphery of the pressure plate.

Operation

Figure 3:
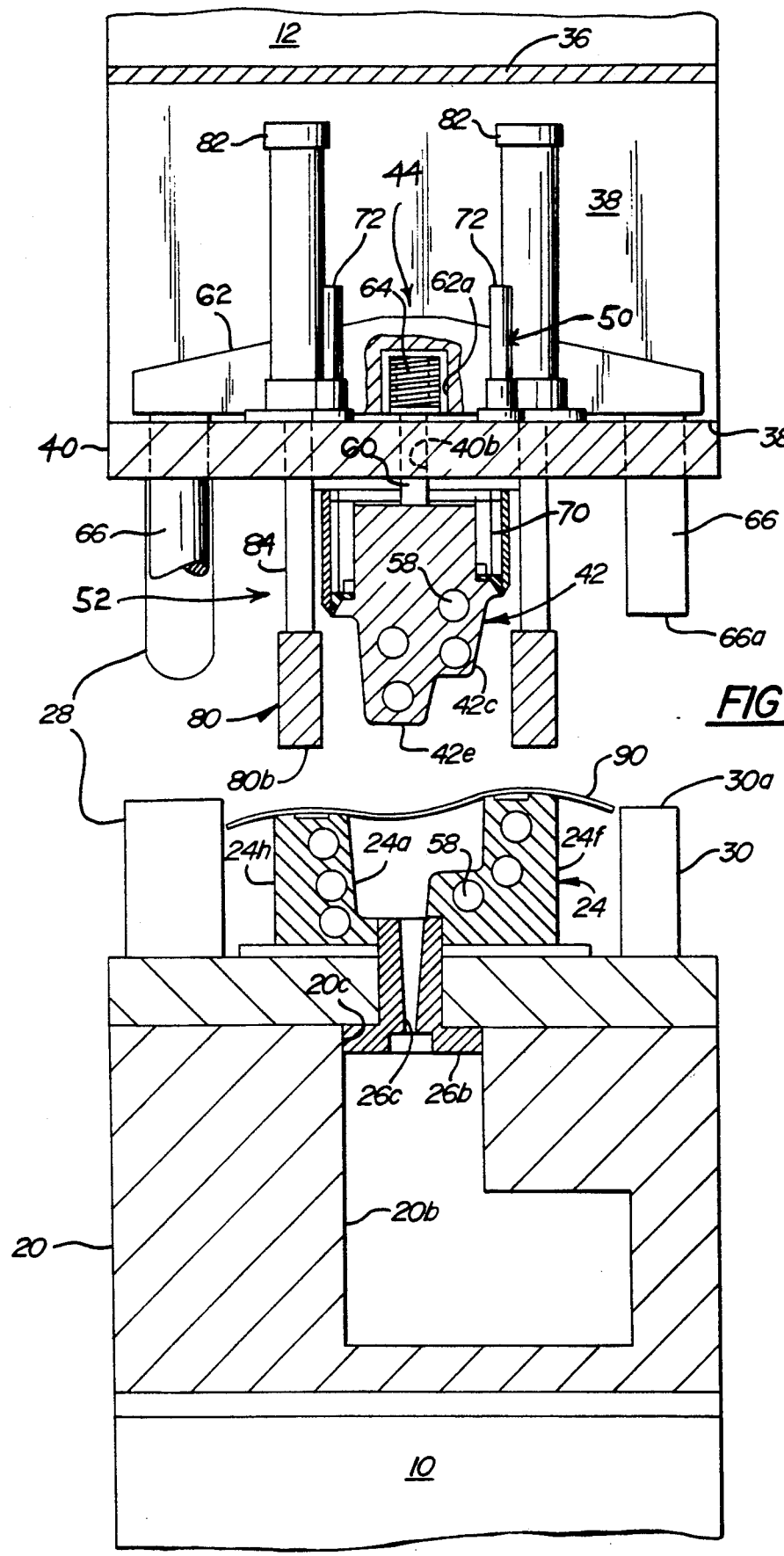
FIG. 3 is a cross-sectional view similar to FIG. 2 but showing the mold parts in their retracted disposition.

With the die set in the retracted or fully open position as seen in FIG. 3 and with cylinders 82 extended to move the pressure plate segments 80 to a location wherein the composite lower face 80k of the pressure plate segments is below or leading the bottom or leading surface 42e of the male die, a sheet of component, reinforcing material 90 is laid over the concavity 24a of the female die 24 with peripheral portions 90a of the sheet extending respectively beyond the side edge surfaces 24e, f, g, and h of the female mold. Sheet 90 may comprise, for example, one or more sheets of woven fiberglass material having a total thickness of, for example, ¼ inch.

The press is now actuated in a manner to move head 12 downwardly toward bed 10 so as to move the upper die set 18 downwardly toward the lower die set 16. As the lower faces 80a of the pressure plate- segments 80 contact the upper face of sheet 90 to clamp the sheet against the annular upper face 24b of the female mold, the upper die set continues downwardly and cylinders 82 are actuated in a manner to gradually retract piston rods 84 so as to maintain clamping force on sheet 90 while allowing the upper die set to continue its downward movement. As the upper die set continues downwardly as allowed by the retracting movement of piston rods 84, the convexity 42c of die member 42 contacts the upper face of sheet 90 and, with continued downward movement of the upper die set, begins to move into the concavity 24a of the lower mold.

Since the fiberglass material of sheet 90 is essentially non-stretchable, the downward movement of convexity 42c into concavity 24a is accompanied by slippage of the component material 90 at the interface between the lower faces 80a of the pressure plate segments and the upper face of the sheet to allow the sheet to move downwardly into concavity 24a along with male mold convexity 42c. The pressure of the fluid delivered to the various cylinders 82 is selectively varied, as measured around the periphery of the annular pattern of the cylinders, to provide selectively varying force against the sheet along the annular undersurface 80a of the pressure plate segments so as to allow the sheet to move smoothly and efficiently downwardly with the convexity 42c into the cavity 24a.

This selective pressure as applied in varying degrees around the annular interface between the pressure plate segments 80 and the component material may be accomplished with a single unitary pressure plate 80 but, in most situations, is more effectively accomplished, as illustrated, by forming the pressure plate 80 of a series of pressure plates segments 80a-80j with at least one cylinder 82 associated with each segment to allow the individual segments to be individually adjusted with respect to the amount of pressure applied by that segment to the component material as the material slips between the interface of surface 80a and the upper face of the female mold for movement into concavity 24a.

The lower limit of movement of male mold 42 into concavity 24a is determined by engagement of the lower faces 66a of rods 66 with the upper faces of stop blocks 30. This delimited position of downward movement of male mold 42 is adjusted to provide a mold cavity 100 of desired dimensions between the convexity 42c of male mold 42 and the concavity 24a of female mold 24.. The downwardly delimited stop position of the male mold also defines an annular access opening 102 between the lower annular face 42g of lip 42 and the annular upper face 24b of the female mold. Annular access opening 102 will be seen to provide access to the mold cavity 100 at a location-external to the mold assembly so as to allow the sheet 90 to be positioned within the cavity 100 by the downward movement of convexity 42c into concavity 24a while allowing the edge portions 90a of the sheet to extend outwardly through access opening 102 to a location external to the mold cavity on all sides of the mold cavity.

After the male mold reaches its delimited downward position, as determined by engagement of surfaces 66a, 30a, the upper die set continues to move downwardly an incremental amount, as seen by a comparison of FIGS. 5A and 5B, to allow the lower edge 46a of the cutting blade 46 to move downwardly through the sheet 90 and sever the sheet so as to trim the sheet to a shape conforming to the closed loop internal periphery of the cutting blade. As seen in FIG. 5B, the upper die set is moved downwardly to a point where the lower sharpened edge of the cutting blade may move slightly into the material of the cutting barrier 32 so as to ensure a total and effective cut. The relative movement as between the male mold 42 and the remainder of the upper die set 18, including the cutting blade, is made possible by the lost motion drive connection provided by rods 60 and springs 64.

After the upper die set has completed its downward movement to the position seen-in FIG. 5B, cylinders 72 are actuated to extend piston rods 74 and press the lower ends of the piston rods downwardly against the upper edge 70a of pressure plate 70 and thereby press the lower edge of the pressure plate against the upper edge of seal 48 so as to, as best seen in FIG. 5C, tend to extrude the lower edge of triangular seal portion 48b downwardly into the interface between blade 46 and male mold lip 42 so as to coact with the cutter blade to ensure that the annular edge of mold cavity 100 is effectively sealed.

Specifically, the inner face 46b of cutter blade 46 effectively precludes fluid leakage radially outwardly out of cavity 100 through annular opening 102, and seal 48 effectively precludes fluid leakage upwardly out of cavity 100 between the male mold and the cutter blade.

Resin is now injected into mold cavity 100 through passage 26c of nozzle 26. The resin is injected under pressure and moves upwardly through the material 90 within the cavity 100 so as to effectively and completely permeate the material 90 and totally fill the cavity 100 with resin and with the component material with movement of the resin beyond the annular edge of the cavity precluded by the inner surface 46b of blade 46 and by seal 48.

The resin injected through nozzle 26 into the mold cavity is preferably a two part reaction type mixture wherein the two ingredients of the resin are mixed in chamber 20b and, during the "cream" time of the resin, the resin is injected through nozzle 26 into the mold cavity by a suitable injection mechanism in the form of a screw or the like (not shown) so as to enter the mold cavity and totally permeate the material 90 throughout the mold cavity.

Following a suitable cure time which will of course vary depending on the part being formed and the nature of the resin employed, upper die set 18 is moved upwardly by head 12 of the press to return the die set to the retracted position seen in FIG. 3, whereafter the formed structural injection molded part 110 is removed from the mold cavity, with the aid of ejectors if necessary, and the invention apparatus is ready to begin another injection molding cycle. The part 110, as seen in FIG. 6, comprises a bumper beam for use on a motor vehicle to support the finish facia of the bumper in the completed motor vehicle.

The invention method and apparatus will be seen to provide a simple and effective system for forming structural injection molded parts utilizing a single apparatus to perform all of the necessary steps required to form the part and allowing all of the steps of the methodology to be performed in an efficient, compact and continuous manner.

Whereas a preferred embodiment of the invention has been illustrated and described in detail, it will be apparent that various changes may be made in the disclosed embodiment without departing from the scope or spirit of the invention.

We claim:

1. A method of forming a structural injection molded part comprising the steps of:
    providing a mold assembly including a female mold defining a concavity and a male mold defining a convexity sized to fit within the concavity of the female mold to defined a mold cavity corresponding to the shape of the part to be molded;
    positioning a closed loop cutting blade in surrounding relation to one of said molds;
    positioning reinforcing material over the concavity of the female mold;
    moving said male mold convexity into said female mold concavity to position said reinforcing material in said mold cavity;
    thereafter moving said cutting blade independently of said one mold to trim said part; and
    injecting resin into said mold cavity to produce a structural injection molded part.

2. A method according to claim 1 wherein:
    said trimming step is performed before said resin injection step.

3. A method according to claim 2 wherein the mold cavity defines a peripheral edge and wherein the method includes the further step of:
    providing a seal around the peripheral edge of said mold cavity to preclude the escape of resin from said mold cavity.

4. A method according to claim 3 wherein the cutting blade has an inner periphery and:
    said seal is provided proximate the inner periphery of said cutting blade.

5. A method according to claim 4 wherein the male mold part is positioned within the cutting blade and defines an annular interface with the cutting blade and an annular seal member is provided around said male mold part at said interface and wherein:

said seal providing step includes pressing said seal member into said interface following said trimming step.

6. A method according to claim 1 wherein:

said resin injecting step is performed by introducing resin into said mold cavity through said female mold part.

7. A method of forming a structural injection molded part comprising the steps of:

providing a mold assembly including a female mold defining a concavity and a male mold defining a convexity sized to fit within the concavity of the female mold to define a mold cavity corresponding to the shape of the part to be molded;

positioning a substantially non-stretchable, reinforcing material over the concavity of the female mold;

clamping said material around the periphery of said mold cavity;

thereafter moving said male mold convexity into said female mold concavity to position said reinforcing material in said mold cavity while selectively controlling the clamping pressure to allow the material to selectively slip past the clamping interface to allow said male mold convexity to move into said female mold concavity;

injecting resin into said mold cavity to produce a structural injection molded part; wherein, said clamping step includes selectively varying the clamping pressure around the clamped peripheral interface to provide a varying clamping force as measured around the clamping interface.

8. A method of forming a structural injection molded part comprising the steps of:

providing a mold assembly including a female mold defining a concavity and a male mold defining a convexity sized to fit within the concavity of the female mold to define a mold cavity corresponding to the shape of the part to be molded;

positioning a substantially non-stretchable, reinforcing material over the concavity of the female mold;

clamping said material around the periphery of said mold cavity with a plurality of individually adjustable clamping segments;

thereafter moving said male mold convexity into said female mold concavity to position said reinforcing material in said mold cavity while individually controlling the clamping pressure exerted by each segment to allow the material to selectively slip past the clamping interface to allow said male mold convexity to move into said female mold concavity; and injecting resin into said mold cavity to produce a structural injection molded part.

9. A method of forming and cutting a structural injection molded part comprising the steps of:

providing a mold assembly including a female mold defining a concavity and a male mold defining a convexity sized to fit within the concavity of the female mold to define a mold cavity corresponding to the shape of the part to be molded;

positioning a closed loop cutting blade in surrounding relation to one of said molds;

positioning reinforcing material over the concavity of the female mold;

moving said male mold convexity into said female mold concavity to position said reinforcing material in said mold cavity; thereafter moving said cutting blade relative to said one mold to trim said part;

injecting resin into said mold cavity to produce a structural injection molded part; wherein, said one mold and said cutting blade are part of and movable with a common die set assembly with a lost motion drive connection between said one mold and said cutting blade, and said trimming step is accomplished by lost motion movement between said one mold and said cutting blade after said male mold has been moved into said female mold.

10. A method of forming a structural injection molded part comprising the steps of:

providing a mold assembly including a female mold defining a concavity and male mold defining a convexity sized to fit within the concavity of the female mold to define a mold cavity corresponding to the shape of the part to be molded;

moving a first of said molds into a second of said molds to position said reinforcing material in said mold cavity; and, injecting resin into said mold cavity to produce a structural injection molded part wherein the method further comprises positioning a closed loop cutting blade in surrounding relation to said first mold, moving said cutting blade with said first mold during the positioning of said reinforcing material, and thereafter moving said cutting blade independently of said first mold to trim said part.

* * * * *

UNITED STATES PATENT AND TRADEMARK OFFICE
CERTIFICATE OF CORRECTION

PATENT NO. : 5,182,065

DATED : January 26, 1993

INVENTOR(S) : Stanley Piotroski et al

It is certified that error appears in the above-indentified patent and that said Letters Patent is hereby corrected as shown below:

```
Column 2, Line 16, Delete "postion-ed" Insert --positioned--
Column 4, Line 38, Delete "a-cutting" Insert --a cutting--
Column 5, Line 21, Delete "top-face" Insert --top face--
Column 5, Line 49, Before "The seal" New Paragraph
Column 6, Line 10, Delete "through-an" Insert --through an--
Column 6, Line 36, Delete "plate-segments"  Insert --plate segments--
Column 7, Line 16, Delete "24.." Insert --24.--
Column 7, Line 21, Delete "location-external" Insert --location
          external--
Column 7, Line 46, Delete "seen-in" Insert --seen in--
```

UNITED STATES PATENT AND TRADEMARK OFFICE
CERTIFICATE OF CORRECTION

PATENT NO. : 5,182,065
DATED : January 26, 1993
INVENTOR(S) : Stanley Piotroski et al It is certified that error appears in the above-indentified patent and that said Letters Patent is hereby corrected as shown below:

On the title page, Item [75], Inventors Delete "Ronald T. Levine" and insert --Ronald T. Levene--.

Signed and Sealed this

Twenty-eighth Day of December, 1993

Attest:

BRUCE LEHMAN

Attesting Officer     Commissioner of Patents and Trademarks